Patented Oct. 4, 1938

2,131,724

UNITED STATES PATENT OFFICE 2,131,724

CONVERSION OF STARCHY POLYSACCHARIDES

George V. Caesar, New York, N. Y., assignor to Stein, Hall & Company, Inc., New York, N. Y., a corporation of New York No Drawing. Application August 26, 1936, Serial No. 98,071

REISSUED

12 Claims. (Cl. 127—33)

This invention relates to new and useful compositions of matter obtainable from starchy polysaccharides, and to a new and improved method of converting starchy polysaccharides.

A number of processes are known for the conversion or degeneration of starch into so-called soluble forms, such as dextrins, thin-boiling and soluble starches. According to most of these methods starch is treated either in the dry form or in aqueous suspension with an acid or with an oxidizing agent; and variously heated. The term "conversion" generally refers to dry treatments. Various processes have also been proposed which involve heating starch with a strongly alkaline substance in one form or another to produce products of a higher order of viscosity than obtained by roasting with or without pretreatments with aqueous acid.

In the various methods of treating starch, urea has been mentioned as an auxiliary gelatinizing agent, or as a substance adapted to lower the temperature at which starch is converted into a gelatinized material. Thus, Hoppler et al., U. S. Patent No. 1,878,852, produces swelling starches by heating thin layers of starch containing the normal proportions of water for a short period between two faces of any desired form, at temperatures above 100° C., and simultaneously applying to the same mechanical pressure of about 2500 kg./cm.$^2$. The use of urea as a substance adapted to lower the temperature at which starch is converted into starch glue is incidentally mentioned, but no proportions are given and it is apparent that the method described involves principally three factors, namely, pressure, heat, and duration of the heat treatment. It produces primarily a gelatinized starch in which the original granular organization is destroyed, as in the various hot-rolled starches.

Bauer, U. S. Patent No. 1,969,347, relates to the treatment of flour by adding thereto a gel inhibiting agent, preferably a sulphite salt, and then converting the starch present. The gel inhibiting agent reacts with the small amount of gluten or other protein substance present in the flour, and thereby prevents the formation of a dough. As pointed out by the patentee, rendering the gluten or other protein inert is desirable because these substances interfere with the proper conversion of the starch. In this process, urea is mentioned as a suitable gel inhibiting agent or reactant to render the proteins inert.

Pierson, U. S. Patents Nos. 1,989,150 and 2,023,973, describes the use of urea in conjunction with oxidizing agents, such as barium peroxide, in the treatment of starch. This treatment preferably involves the blending of a dry glue base by mixing together a starch, urea, an oxidizing agent, and a filler, and the treatment of this glue base with water and a caustic alkali by the user. No claims are advanced with respect to degenerated starches, such as dextrins, etc., and the starch in the dry blend, as marketed, is wholly unaltered. Furthermore, the preparation of the glue by the user involves the use of an alkali, and in this respect is analogous to other methods of treating starch with an alkali.

It is an object of the present invention to produce a new and improved amylaceous composition of new and useful properties. A further object is to produce an amylaceous composition of British gum, soluble in water, at relatively low temperatures, in the sense that it readily disperses in the water, but unlike an ordinary dextrin or British gum of similar dispersibility, has a body or viscosity in its liquid suspension which is relatively very high, its consistency being more analogous to that of an unconverted starch than that of a "British gum" dextrin. Another object is to produce a dry material which disperses in water and behaves generally in a manner similar to natural gums, such as, for example, gum karaya and gum shiraz. A further object is to produce a new and improved composition which has a wide variety of uses, and especially in the field of natural gums, textile color-printing pastes, as an adhesive, as a thickener or carrier for other gums, and in impregnating, coating and sizing fibrous sheet materials, for example, paper, cloth and the like. A still further object is the provision of a new and improved process for producing compositions of the character above described. Other objects will appear hereinafter.

In accordance with this invention I have found that a new and useful composition of matter which is dispersible in water at moderate temperatures, may be obtained by the conversion of a starchy polysaccharide with a suitable amide, such as carbamide, commonly known as urea.

In practicing the invention I prefer to heat the starch in its natural air-dry condition to a temperature at which all, or nearly all, of the original moisture present has been removed, then to add urea and continue the heating. In this manner a conversion of the starch occurs, but the normal degeneration or hydrolytic scission, characteristic of other types of conversion, is shown by chemical tests to be reduced. The granules of the converted product retain their original form, but may have undergone an incipient process of structural reorganization promoting swelling or hydration in aqueous suspension. The resultant gum will disperse to an exceptionally heavy body in water at relatively low temperatures, with little or none of the normal granular disorganization which is so characteristic of the various so-called dextrin solutions.

The term "soluble" as applied to starch and dextrins is somewhat misleading, because a starch or dextrin properly possesses no true solubility, but only a varying degree of dispersion in aqueous suspension. The composition of my invention is "soluble" in the sense that it readily disperses in water to give a transparent or translucent dispersion; but unlike an ordinary dextrin of similar dispersibility, the body or viscosity of its liquid suspension is relatively high, its consistency being more analogous to that of an unconverted starch than that of a dextrin. In this respect my product resembles a British gum or roasted dextrin having a viscosity of the order of a starch. Unlike many of the so-called soluble starches, however, it will disperse in aqueous suspension at relatively low temperatures and its liquid paste will not vary greatly in consistency from hot to cold; nor will the body of its paste, upon long standing, tend appreciably to set to an immobile gel, as is generally true of the starchier pastes. The extraordinary stability of the liquid gum produced by this polysaccharide composition constitutes one of its most remarkable and useful properties.

The invention will be further illustrated, but is not limited, by the following examples, in which the quantities are stated in parts by weight, unless otherwise indicated:

*Example I*

Eighteen (18) pounds of tapioca flour were placed in a suitable converter and heated. At a temperature of 132° C., 408 grams of carbamide (urea) were added and the conversion carried to a temperature of 193° C. over a total period of four hours.

The product was removed from the converter and found to be readily hydrated in cool water to produce a dispersion of relatively high viscosity which did not very markedly tend to increase in consistency, upon standing, nor after having been cooked and cooled. This product was substantially free from urea. Comparative tests showed that it possessed markedly different properties from ground tapioca, hot-rolled tapioca, and the usual type of soluble roasted dextrin (British gum). In the dry powdered state, it had a creamy or light brown color. It readily dispersed in water without heating to give a homogeneous translucent gum resembling a natural gum. Its dispersions, e. g., one part of solid to 6–8 parts of water, were much more viscous than the dispersions made with the same amount of the ordinary soluble roasted dextrin (British gum). As compared with hot-rolled starch dispersions, it also showed a much higher viscosity at high temperatures, and a different consistency at all temperatures, for the same amount dispersed. Its dispersions were short and soft, not stringy and sticky like the hot-rolled starch dispersions. Moreover, it gave no substantial granular disorganization as in the case of hot-rolled starches and ordinary British gums.

*Example II*

Eighteen (18) pounds of tapioca flour were placed in a suitable converter and heated. At a temperature of 115° C., 408 grams of carbamide (urea) were added and the conversion carried to 205° C. over a total period of three hours and fifty minutes, with results resembling Example I.

*Example III*

Example I was repeated with sago flour instead of tapioca flour, the proportions and conditions being the same otherwise. Similar results were obtained.

Similarly, the invention is applicable to the treatment of other starchy polysaccharides. As further examples of specific carbohydrates may be mentioned wheat, rye, barley, oat, rice, maize and potato starches, and sago and cassava flours. In general, especially good results have been obtained with starches and flours substantially free from proteins.

The amount of moisture initially present in the starchy polysaccharide may vary within relatively wide limits. Good results have been obtained by using starch in its normal air-dry condition, e. g., containing approximately 10% to 20% moisture. However, if desired, pre-moistened starch may be used, for example, starch containing more than about 20% of moisture but insufficient amounts to cause gelatinization upon heating. If desired, the starchy material may be given a preliminary spraying treatment with an acid after the normal fashion, to be followed later by the addition of urea, to obtain results intermediate between normal products and those which are typical of straight urea conversions.

The amount of urea is subject to variation, depending particularly upon the type of material treated and the results desired. In general, it is preferable to employ about 2% to 5% of urea on the basis of the natural air-dry weight of the starch. However, more or somewhat less urea may be employed.

The temperature of conversion may vary within relatively wide limits. Thus, the temperature at which active conversion takes place may vary within the range of about 130° C. to about 200° C. Normally, good results are obtained by carrying out the reaction at temperatures below 200° C. The time of heating may vary, depending upon such factors as the raw material treated and the results desired.

The process may be carried out at atmospheric pressure. However, lower or higher pressures may be used if desired.

The urea may be added to the starchy polysaccharide before the starch has been subjected to heat, that is, at the beginning of the conversion. Addition of the urea at an intermediate stage of the conversion tends to reduce the amount of tailings.

While the invention is not limited to any theory, it is believed that the useful results obtainable by the presence of urea in the treatment of a starchy polysaccharide as herein described may be explained on the following basis: Urea melts and decomposes under ordinary pressures at a temperature between 130° C. and 160° C. to ammonia, ammonium cyanate, and biuret, the cyanate subliming. Between 160° and 190° C. increasing amounts of biuret, as well as cyanuric acid and ammelide are formed; above 190° C. the biuret decomposes, yielding cyanuric acid, ammelide, and tricyanourea. Above 200° C. urea is said to decompose to ammonia, cyanuric acid, tricyanourea, and ammelide; but for the majority of dextrin conversions the process will terminate at not to exceed 200° C. Practically speaking, the normal conversion range will vary somewhat between a minimum temperature sufficient for conversion and the temperature at which substantial charring occurs. In the conversion representative of my process, the starch granules may become coated with melted urea; and so the ammonia, which is given off abundantly, is generated directly on the granules—"In situ" as it were—in a manner most effective to prevent active hydrolysis with consequent scission or degeneration, an effect invariably accompanied by great loss in the body or consistency of the subsequently formed liquid gum. It is this release of ammonia gas intimately throughout the mass of the charge which may account for the unusual effect of urea in preventing structural degeneration and loss of viscosity or body.

As a further explanation it is believed that the molten urea may induce an incipient swelling or enlargement of the granule with consequent structural dispersion which should conceivably promote subsequent hydration and so account for the useful property of easy and rapid dispersion possessed by compositions of my invention in water at relatively low temperatures.

The composition of my invention is commercially useful in: (1) The field of so-called natural gums, e. g., gum shiraz, and the like; (2) for textile color-printing gums and pastes; (3) as an adhesive, and particularly in the field of paper adhesives; (4) as a thickener or carrier for other products, e. g., fuller's earth, bentonite, starch, starch mixtures with formaldehyde, caustic alkalis, and/or borax; (5) as a paper beater size for certain types of paper and paper board; and (6) generally, in impregnating, sizing, coating, filling and gluing fibrous sheet materials, for example, paper, paper board, cloth, and similar materials.

It will be understood that auxiliary agents may be added to my compositions for various purposes. Thus, I may add oxidizing and reducing agents, e. g., sodium perborate, sodium bisulfite, sodium hydrosulfite, sodium formaldehyde sulfoxalate, and similar compounds.

The advantages of the invention will be apparent. I have found that by heating a starchy polysaccharide with urea in sufficient amounts at temperatures above its melting and decomposing point, it is possible to produce an amylaceous substance dispersible in water at relatively low temperatures and having other new and useful characteristics. Furthermore, it is possible to convert the starchy polysaccharide with urea by my process without the necessity for high pressures. Additionally, my product differs generally from the products obtained by the processes heretofore described in that it is essentially a type of polysaccharide product commercially known as a British gum, formed by roasting, but having special physical and chemical properties, as previously noted.

Having thus described the invention, what I claim as new and desire to secure by Letters Patent of the United States is:

1. The process which consists in heating a starchy polysaccharide with urea at a temperature of at least the melting point of urea in a substantially dry state under substantially atmospheric pressures until a product dispersible in water at ordinary temperatures is obtained.

2. The process which consists in reacting together starch and molten urea in a substantially dry state under substantially atmospheric pressures until a product dispersible in water at ordinary temperatures is obtained.

3. The process which consists in heating a normally air-dry starchy polysaccharide to a temperature sufficient to remove most of the moisture present therein, adding urea and heating the resultant mixture to a temperature above the decomposition point of urea under substantially atmospheric pressures until a conversion product dispersible in water at ordinary temperatures is formed.

4. The process which consists in heating starch in the air-dry state to a temperature of about 130° C. without destroying the starch structure, then adding about 2% to about 5% urea, and continuing the heating to a temperature at which the urea melts and materially decomposes and a starch conversion product is formed which has substantially the original granular structure of the starch and disperses in water at ordinary temperatures without substantial granular disorganization.

5. The process which consists in heating starch with urea under substantially dry conditions and under substantially atmospheric pressure at a temperature above the decomposition point of urea, but below about 200° C. until a conversion product dispersible in water at ordinary temperatures is formed.

6. A cold water-dispersible starchy polysaccharide conversion product which is a reaction product of a starchy polysaccharide with urea, at a temperature at least as high as the decomposition point of urea in the presence of insufficient moisture and under pressure and temperature conditions insufficiently high to destroy the original starch structure.

7. A cold water-dispersible starch conversion product which is a product of the reaction in a substantially dry state of a starch with urea, at a temperature at least as high as the decomposition point of the urea but under temperature and pressure conditions insufficiently high to destroy the original starch structure.

8. A process of producing a cold water-dispersible starch conversion product which comprises heating tapioca flour containing insufficient moisture for gelatinization in the presence of urea under substantially dry conditions at a temperature within the range of about 130° C. to about 200° C., and under pressure conditions insufficiently high to destroy the starch structure until a conversion product is formed which disperses in water at ordinary temperatures and pressures.

9. A conversion product of a starchy polysaccharide with urea which possesses substantially the structure of the starchy polysaccharide in the dry state and will disperse in water at ordinary temperatures taking up at least six parts of water per part of conversion product without substantial granular disorganization to produce dispersions which will not vary greatly in consistency with variations in temperature.

10. A tapioca flour-urea conversion product which resembles a natural gum in many of its properties and possesses substantially the structure of the natural tapioca flour in the dry state, and which will disperse in six to eight parts of water per part of conversion product at ordinary temperatures without substantial granular disorganization to produce viscous dispersions which will not vary greatly in consistency with variations in temperature.

11. A method of producing a cold water-dispersible starch conversion product which comprises heating a starchy polysaccharide containing insufficient moisture for gelatinization with urea under substantially dry conditions at temperatures within the range of about 130° C. to about 200° C. and under substantially atmospheric pressures until a conversion product is formed which disperses in water at ordinary temperatures and pressures.

12. A method of producing cold water-dispersible starch conversion products which comprises heating a starchy polysaccharide which is substantially free from proteins and containing insufficient moisture for gelatinization in the presence of urea under substantially dry conditions at a temperature within the range of about 130° C. to about 200° C. and at pressures not substantially higher than atmospheric until a conversion product is formed which disperses in water at ordinary temperatures and pressures.

GEORGE V. CAESAR.